Patented Dec. 13, 1949

2,490,911

UNITED STATES PATENT OFFICE 2,490,911

PROCESS FOR PURIFYING ANTIFIBRINOLYSIN

Eugene C. Loomis, Grosse Pointe Park, Albert Ryder, Detroit, and Charles George, Jr., Ferndale, Mich., assignors to Parke, Davis & Company, Detroit, Mich., a corporation of Michigan No Drawing. Application March 1, 1947, Serial No. 731,864

10 Claims. (Cl. 260—112)

This invention relates to blood products and to methods for obtaining the same. More particularly, the invention relates to antifibrinolysin products.

Antifibrinolysin is the name given to an activity present in blood plasma or serum which blocks the action of fibrinolysin on fibrin or fibrinogen. However, there are numerous objections of a practical nature to the use of plasma or serum for bringing about such action. For example, in skin grafting or like procedures where it is desired to obtain and maintain a firm fibrin clot, the use of plasma or serum would involve use of large volumes of the same. Furthermore, the presence of certain impurities or concomitant foreign protein-like materials would cause undesirable reactions in the human subject, especially when using a plasma or serum from animal blood. Hence, a concentrated and purified material is highly desirable and is provided for the first time by the instant invention. We have found that our new product also has the valuable property that it does not inactivate prothrombin or thrombin. Thus, in skin-grafting where open lesions are present, the patient's own blood clotting mechanism is not interfered with.

We have found that a very valuable antifibrinolysin product may be obtained from either blood plasma or serum by simply adding sufficient ammonium sulfate to the plasma or serum at about −5 to 5° C. to bring the ammonium sulfate concentration to at least 50% of saturation, removing the precipitated material, dialyzing the clear solution through a semi-permeable membrane until it is substantially free from all inorganic salts and dialyzable organic material, and then freezing the dialysand and subliming the ice therefrom under greatly reduced pressure.

Human, bovine or equine plasmas or serums can be used with equal success in our process. However, we prefer to use the plasma or serum of bovine origin because such materials are commercially available in large quantities.

The ammonium sulfate saturation step of the process can be carried out in a number of different ways. Solid ammonium sulfate can be added to the cold plasma or serum until the desired concentration is reached or a saturated solution of ammonium sulfate can be used. However, we have found that the exclusive use of the solid ammonium sulfate results in a mixture from which it is rather difficult to remove the precipitated materials. On the other hand, the exclusive use of a saturated solution of ammonium sulfate results in an undesirably large volume of solution to dialyze and subsequently dry from the frozen state. While these objections do not affect the workability of the process for the isolation of this valuable blood product, they do have a bearing on the economical commercial use of the process. We have discovered that these difficulties can be circumvented by first adding a saturated solution of ammonium sulfate to the plasma or serum until the ammonium sulfate concentration reaches a value of somewhere in the neighborhood of 40% of saturation and then adding sufficient solid ammonium sulfate to raise the salt concentration to the desired value. This same result can also be obtained by first diluting the serum or plasma with distilled water and then adding solid ammonium sulfate until the desired salt concentration is reached.

We have found that the best antifibrinolysin preparations are obtained when the ammonium sulfate concentration of the serum or plasma in the precipitation step is adjusted to between about 60 and 70% of saturation. In dialyzing the clear solution after the addition of the ammonium sulfate, any suitable semi-permeable membrane may be used such as cellophane or other similar cellulosic membrane or an animal membrane such as hog or beef intestine.

Although the antifibrinolysin obtained by the process of the present invention is associated with inert blood albumin, these compositions represent the first stable and therapeutically valuable products containing antifibrinolysin. These products which contain at least one unit of antifibrinolysin per milligram may be standardized and dispensed in a sealed ampoule or similar container containing a predetermined unitage or dose. One unit of antifibrinolysin is the amount of antifibrinolysin required to inhibit one unit of fibrinolysin (the amount of fibrinolysin which will dissolve one cubic centimeter of a 0.3% fibrin clot in two minutes).

The antifibrinolysin present in these new products possesses a number of distinguishing characteristics in addition to its ability to inhibit fibrinolysin. It is a non-dialyzable protein possessing properties similar to the albumins. It is soluble in water and saline and is not precipitated from plasma or serum by salts such as sodium chloride, sodium sulfate or ammonium sulfate. This protein possesses no isoelectric point between pH's 2 to 10 but is negatively charged and migrates in a similar manner to other proteins on electrophoresis. It is very light cream to white in color. It is inactivated by heat, organic solvents such as chloroform, and acetone but it is relatively stable in aqueous acid and alkaline solutions.

The invention is illustrated by the following examples.

*Example 1*

666 cc. of saturated ammonium sulfate solution is added to one liter of fresh bovine plasma at 0 to 5° C. Solid ammonium sulfate is added to the cold plasma until the concentration of the ammonium sulfate reaches 65% of saturation. The precipitate which has separated from the plasma is removed by centrifugation and discarded. The supernatant solution is dialyzed against cold water through a semi-permeable membrane until it is substantially free from all inorganic salts and dialyzable organic material. The dialysand is placed in a bottle, frozen in the customary shell form and the ice sublimed from the frozen material under greatly reduced pressure such as less than 0.5 mm. mercury.

The residue which consists of the desired antifibrinolysin product is a light, fluffy, cream-colored solid. The yield of material is about 10 g. assaying about 1.5 to 2.0 units of antifibrinolysin per milligram. The inactive material present in this water-soluble product is albumin. However, the presence of this contaminant in no way detracts from the usefulness of the product in skin grafting procedures. This product is stable and may be dispensed for future use in sealed ampoules or other similar containers containing a predetermined unitage or dose.

If desired, instead of carrying out the ammonium sulfate precipitation as outlined above it may be effected by either adding the requisite amount of solid ammonium sulfate or by adding 2 volumes of saturated ammonium sulfate solution to the cold plasma. The antifibrinolysin product obtained by either of these procedures possesses the same characteristics as that obtained by the method described in detail above.

Similarly, by substituting equine or human plasma for the bovine plasma used in the above procedure one obtains an antifibrinolysin product which possesses the same properties as that obtained from bovine plasma.

*Example 2*

5 gallons of frozen oxalated bovine plasma is allowed to melt at a temperature of about 2 to 3° C. and the undissolved fibrinogen removed from the liquid. 1200 cc of a 2.5% solution of calcium chloride is added and the precipitated proteinaceous material removed and discarded. Sufficient saturated ammonium sulfate solution is added to the clear supernatant liquid to bring the ammonium sulfate concentration up to 25% of saturation. The material which precipitates is collected and discarded. The ammonium sulfate concentration of the supernatant liquid is raised to 29% of saturation and the profibrinolysin which separates removed.

About two-thirds volume of saturated ammonium sulfate solution is added to the clear supernatant serum and then sufficient solid ammonium sulfate is added to bring the ammonium sulfate concentration up to about 65% of saturation. The precipitated material is removed by centrifugation and the supernatant liquid dialyzed against cold water through a semi-permeable membrane. The dialysis is continued until the dialysand is substantially free from inorganic salts and dialyzable organic material. The dialysand is placed in bottles, frozen in the customary shell form and the ice sublimed from the frozen material under greatly reduced pressure.

The antifibrinolysin product obtained by this method possesses the same properties as that obtained from plasma by the process described in Example 1. The yield of the product is 175 to 200 g. having a purity of about 1.5 to 2 units of antifibrinolysin per milligram. This product may be dispensed in standardized form for use in skin grafting in ampoules, vials or other similar containers.

*Example 3*

650 cc. of saturated ammonium sulfate solution is added to one liter of human blood serum at 0 to 5° C. Sufficient solid ammonium sulfate is added to the mixture to bring the ammonium sulfate concentration up to about 60 to 65% of saturation. The precipitated proteinaceous materials are removed by centrifugation and discarded. The clear supernatant liquid is placed in a cellophane dialyzing bag and dialyzed against cold water until all the inorganic salts and dialyzable organic materials have been removed. The dialysand is removed, placed in bottles, shell frozen and the ice sublimed from the frozen material under greatly reduced pressure. The residual material which consists of the desired antifibrinolysin product is a light, fluffy, very light cream colored solid. It is stable at room temperature for an extended period of time and has a purity of about 1.5 to 2.0 units of antifibrinolysin per milligram. Like the products of the foregoing examples it may be dispensed in sealed containers to physicians for use in skin grafting.

If desired, equine serum may be used instead of human serum in the above procedure. The product obtained in this case possesses the same properties as that obtained from human serum as described above, and bovine serum, as described in Example 2.

Attention is called to our copending application Serial No. 750,364, filed May 24, 1947, as a continuation-in-part of the instant application. Said application 750,364 discloses and claims a process utilizing ammonium sulfate solutions of partially purified antifibrinolysin produced as disclosed herein by adding ammonium sulfate to blood plasma or serum at a temperature below about 5° C. to bring the ammonium sulfate concentration to at least 50% of saturation.

What we claim as our invention is:

1. Process for obtaining an antifibrinolysin product which comprises adding sufficient ammonium sulfate to a blood liquid of the class consisting of plasma and serum at about −5 to +5° C. to bring the ammonium sulfate concentration to at least 50% of saturation, removing the precipitated material to obtain a purified solution, dialyzing the solution against water through a semi-permeable membrane until it is substantially free from inorganic salts and dialyzable organic material and then freezing the dialyzand and subliming the ice therefrom under greatly reduced pressure.

2. Process for obtaining an antifibrinolysin product which comprises adding sufficient ammonium sulfate to blood plasma at about −5 to +5° C. to bring the ammonium sulfate concentration to at least 50% of saturation, removing the precipitated material to obtain a purified solution, dialyzing the solution against water through a semi-permeable membrane until it is substantially free from inorganic salts and dialyzable organic material and then freezing the dialysand and subliming the ice therefrom under greatly reduced pressure.

3. Process for obtaining an antifibrinolysin product which comprises adding sufficient ammonium sulfate to blood serum at about —5 to +5° C. to bring the ammonium sulfate concentration to at least 50% of saturation, removing the precipitated material to obtain a purified solution, dialyzing the solution against water through a semi-permeable membrane until it is substantially free from inorganic salts and dialyzable organic material and then freezing the dialysand and subliming the ice therefrom under greatly reduced pressure.

4. Process for obtaining an antifibrinolysin product which comprises adding sufficient ammonium sulfate to bovine blood plasma at about —5 to +5° C. to bring the ammonium sulfate concentration to at least 50% of saturation, removing the precipitated material to obtain a purified solution, dialyzing the solution against water through a semi-permeable membrane until it is substantially free from inorganic salts and dialyzable organic material and then freezing the dialysand and subliming the ice therefrom under greatly reduced pressure.

5. Process for obtaining an antifibrinolysin product which comprises adding sufficient ammonium sulfate to bovine blood serum at about —5 to +5° C. to bring the ammonium sulfate concentration to at least 50% of saturation, removing the precipitated material to obtain a purified solution, dialyzing the solution against water through a semi-permeable membrane until it is substantially free from inorganic salts and dialyzable organic material and then freezing the dialysand and subliming the ice therefrom under greatly reduced pressure.

6. Process for obtaining an antifibrinolysin product which comprises adding sufficient ammonium sulfate to human blood plasma at about —5 to +5° C. to bring the ammonium sulfate concentration to at least 50% of saturation, removing the precipitated material to obtain a purified solution, dialyzing the solution against water through a semi-permeable membrane until it is substantially free from inorganic salts and dialyzable organic material and then freezing the dialysand and subliming the ice therefrom under greatly reduced pressure.

7. Process for obtaining an antifibrinolysin product which comprises adding sufficient ammonium sulfate to a blood liquid of the class consisting of plasma and serum at about —5 to +5° C. to bring the ammonium sulfate concentration to about 60 to 70% of saturation, removing the precipitated material to obtain a purified solution, dialyzing the solution against water through a semi-permeable membrane until it is substantially free from inorganic salts and dialyzable organic material and then freezing the dialysand and subliming the ice therefrom under greatly reduced pressure.

8. Process for obtaining an antifibrinolysin product which comprises adding sufficient ammonium sulfate to bovine blood plasma at about —5 to +5° C. to bring the ammonium sulfate concentration to about 60 to 70% of saturation, removing the precipitated material to obtain a purified solution, dialyzing the solution against water through a semi-permeable membrane until it is substantially free from inorganic salts and dialyzable organic material and then freezing the dialysand and subliming the ice therefrom under greatly reduced pressure.

9. Process for obtaining an antifibrinolysin product which comprises adding sufficient ammonium sulfate to bovine blood serum at about —5 to +5° C. to bring the ammonium sulfate concentration to about 60 to 70% of saturation, removing the precipitated material to obtain a purified solution, dialyzing the solution against water through a semi-permeable membrane until it is substantially free from inorganic salts and dialyzable organic material and then freezing the dialysand and subliming the ice therefrom under greatly reduced pressure.

10. Process for obtaining an antifibrinolysin product which comprises adding sufficient ammonium sulfate to human blood plasma at about —5 to +5° C. to bring the ammonium sulfate concentration to about 60 to 70% of saturation, removing the precipitated material to obtain a purified solution, dialyzing the solution against water through a semi-permeable membrane until it is substantially free from inorganic salts and dialyzable organic material and then freezing the dialysand and subliming the ice therefrom under greatly reduced pressure.

EUGENE C. LOOMIS.
ALBERT RYDER.
CHARLES GEORGE, JR.

REFERENCES CITED

The following references are of record in the file of this patent:

Chem. Abstracts, vol. 29, page 8043 (1935) citing: Doudoroff—Proc. Soc. Exptl. Biol. and Med., 32, pp. 1467–1468 (1935).

Cohn: Chemical Reviews, vol. 28 (1941), pp. 395–417.

Adams et al.: Amer. Jour. Med. Sci., 205, pp. 538 to 544 (1943).